United States Patent [19]
Aguilera et al.

[11] Patent Number: 5,627,727
[45] Date of Patent: May 6, 1997

[54] PORTABLE COMPUTER ASSEMBLY AND METHOD

[75] Inventors: Rafael E. Aguilera, Simpsonville; Robert J. Crockett, Central, both of S.C.

[73] Assignee: NCR Corporation, Dayton, Ohio

[21] Appl. No.: 300,602

[22] Filed: Sep. 2, 1994

[51] Int. Cl.$^6$ .................................. G06F 1/16; H05K 7/00
[52] U.S. Cl. ......................... 361/686; 361/725; 439/374
[58] Field of Search .................... 361/679–686, 361/724–725; 439/347, 348, 357, 373, 140, 141, 928, 928.1, 929; 455/89, 90, 347–350

[56] References Cited

U.S. PATENT DOCUMENTS

| | | | |
|---|---|---|---|
| 4,480,835 | 11/1984 | Williams | 273/148 B |
| 4,485,946 | 12/1984 | Liautaud et al. | 224/242 |
| 4,654,818 | 3/1987 | Wetterau, Jr. | 364/900 |
| 4,773,032 | 9/1988 | Uehara et al. | 364/709.04 |
| 4,788,658 | 11/1988 | Hanebuth | 364/900 |
| 5,052,943 | 10/1991 | Davis | 439/357 |
| 5,142,124 | 8/1992 | Driessen | 219/247 |
| 5,209,583 | 5/1993 | Lewis et al. | 400/88 |
| 5,227,953 | 7/1993 | Lindberg et al. | 361/686 |
| 5,408,382 | 4/1995 | Schultz et al. | 361/686 |

Primary Examiner—Leo P. Picard
Assistant Examiner—Jayprakash N. Gandhi
Attorney, Agent, or Firm—Paul J. Maginot

[57] ABSTRACT

A portable computer assembly includes a portable computer and a receptacle adapted to hold the portable computer. The portable computer assembly further includes a base for supporting the receptacle. Moreover, the portable computer assembly includes a latch for latching the receptacle to the base. Additionally disclosed is a method of removing particulate from a portable computer storage system which includes a receptacle, a base, and a locking mechanism.

21 Claims, 11 Drawing Sheets

PORTABLE COMPUTER ASSEMBLY AND METHOD

BACKGROUND OF THE INVENTION

The present invention relates generally to a portable computer assembly, and more particularly to a portable computer assembly which is adapted to facilitate removal of undesirable particulate, such as dust and dirt, therefrom. The invention also relates to a method of removing undesirable particulate, such as dust and dirt, from a portable computer assembly.

Portable computer assemblies which include a hand held computer and a station in which the hand held computer is able to be stored are known for use in maintenance of product inventory and management of sale of goods.

For example, U.S. Pat. No. 4,773,032 issued to Uehara et al. discloses a terminal input apparatus for such a use. The terminal input apparatus includes a portable input device having a data input key and a main device provided with a holder for holding the portable input device therein. The holder has a main device side connector which is to be connected to a connector arranged in the lower portion of the portable input device. The holder is arranged so that the holder can be moved relative to the main device between a storing position and an extraction position.

One problem which prior art portable computer assemblies may encounter is the undesirable collection of particulate, such as dust and dirt, in the station of the assembly which holds the portable computer. This is especially a problem when a functioning mechanism, such as an optical signal transmission device, is located at the bottom portion of a receptacle of the station. The above patent issued to Uehara acknowledges this problem and attempts to solve it by adding a pivoting lid to its holder (i.e. receptacle) in order to prevent dust from entering the holder.

Another problem associated with prior art portable computer assemblies is an inability to quickly and inexpensively repair a damaged receptacle of a station of the portable computer assembly.

Moreover, another problem which may be encountered by prior art portable computer assemblies is an inability for a station to quickly and inexpensively accommodate changes in the design of an associated portable computer.

SUMMARY OF THE INVENTION

In accordance with one embodiment of the present invention, there is provided a portable computer assembly which includes a portable computer and a receptacle adapted to hold the portable computer. The portable computer assembly further includes a base for supporting the receptacle, in addition, the portable computer assembly includes a latch for latching the receptacle to the base.

Pursuant to another embodiment of the present invention, there is provided a method of removing particulate from a portable computer storage system which has a receptacle, a base and a latch. The method includes the steps of (1) latching the receptacle to the base so as to prevent release of the receptacle from the base, (2) unlatching the receptacle from the base so as to allow release of the receptacle from the base, (3) separating the receptacle from the base after the unlatching step, and (4) removing particulate from the receptacle after the separating step.

In accordance with yet another embodiment of the present invention, there is provided a portable computer storage system which includes a receptacle adapted to hold a portable computer. The system further includes a base for supporting the receptacle. Moreover, the system includes a lock and release mechanism for locking the receptacle to the base.

It is therefore an object of the present invention to provide a new and useful portable computer assembly.

It is another object of the present invention to provide an improved portable computer assembly.

It is a further object of the present invention to provide a new and useful method for removing particulate from a portable computer storage system.

It is moreover an object of the present invention to provide an improved method for removing particulate from a portable computer storage system.

It is still another object of the present invention to provide a portable computer storage system which allows quick, inexpensive and easy removal of undesirable particulate, such as dust and dirt, from the station of the portable computer storage system.

It is moreover another object of the present invention to provide a quick, inexpensive and easy method for removing particulate from a portable computer storage system.

It is yet another object of the present invention to provide a portable computer storage system which quickly and inexpensively accommodates changes in the design in an associated portable computer.

The above and other objects, features, and advantages of the present invention will become apparent from the following description and the attached drawings.

DETAILED DESCRIPTION OF THE PREFERRED EMBODIMENT

Figure 1:
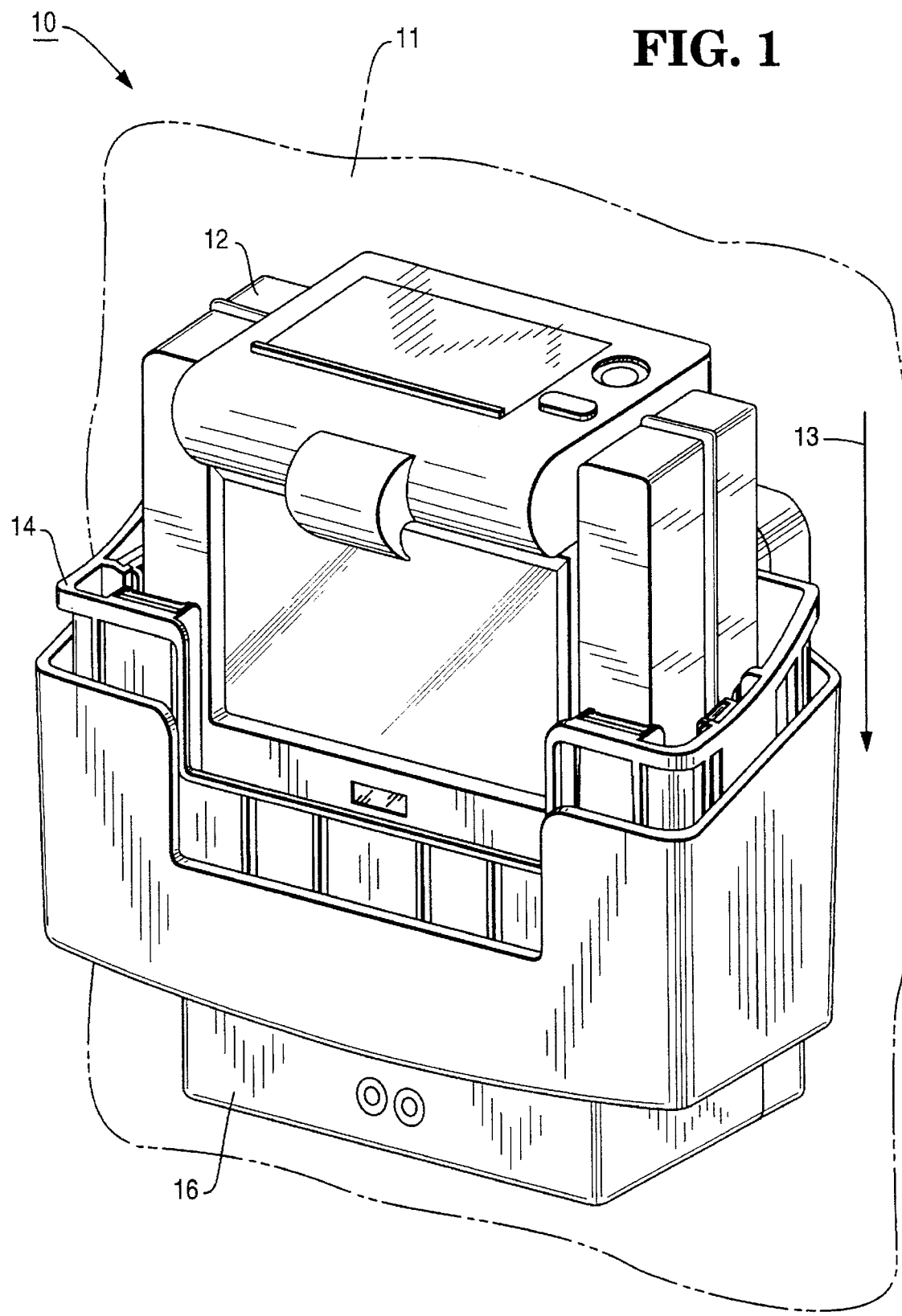
FIG. 1 is a perspective view of a portable computer assembly that incorporates the features of the present invention therein, with the portable computer assembly including a portable computer, a receptacle and a base.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a portable computer assembly 10 which includes a portable computer 12, a receptacle 14, and base 16. The assembly 10 is mounted on a wall 11 of a moving vehicle (not shown). The receptacle 14 is adapted to hold the portable computer 12. The base 16 supports the receptacle 14 therein. The base 16 may include a number of holes (not shown) defined in a bottom portion thereof in order to allow water, which inadvertently entered the base, to drain out of the base.

Figure 2:
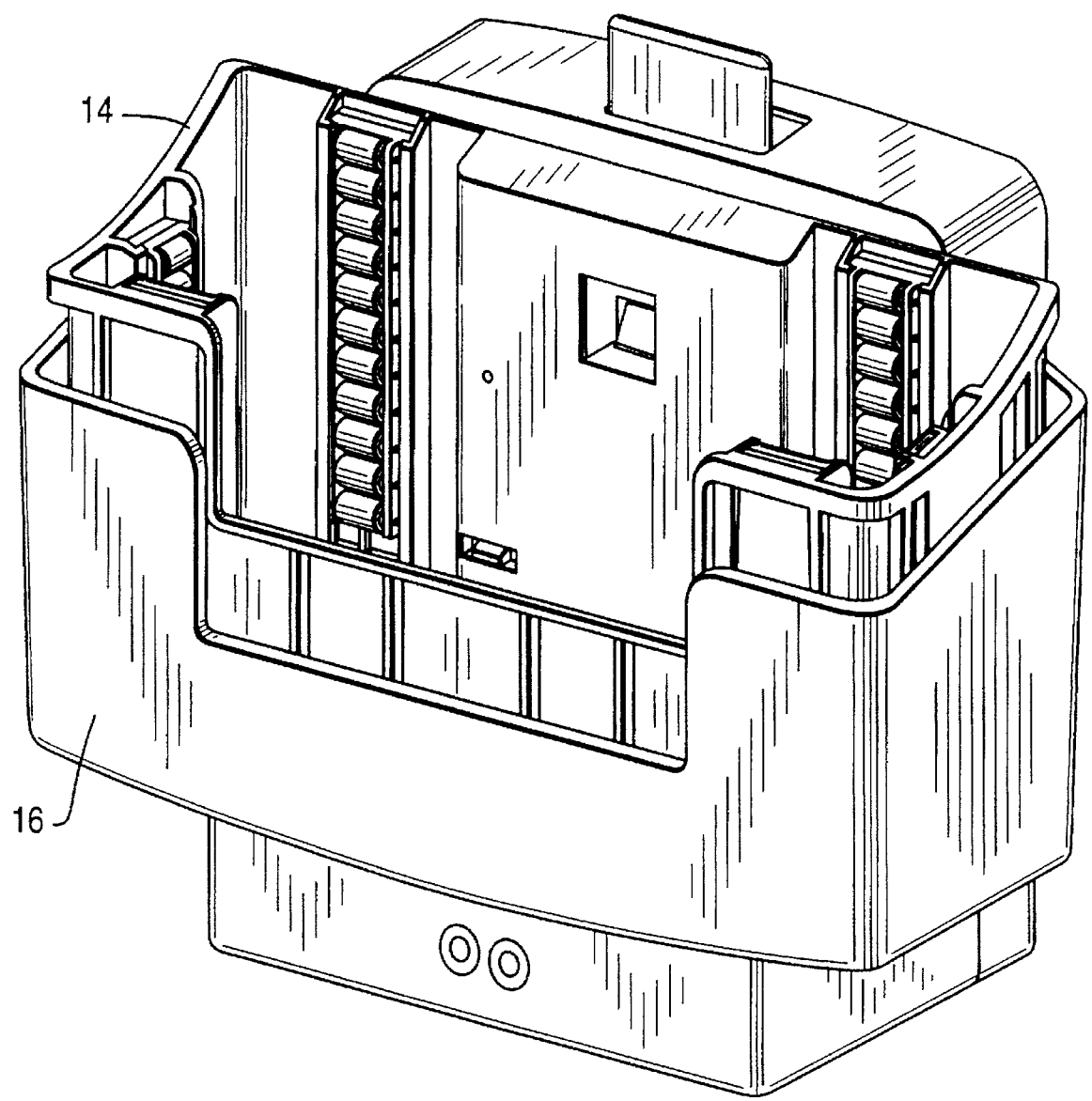
FIG. 2 is a perspective view of the receptacle and base of the portable computer assembly of FIG. 1.
Figure 3:
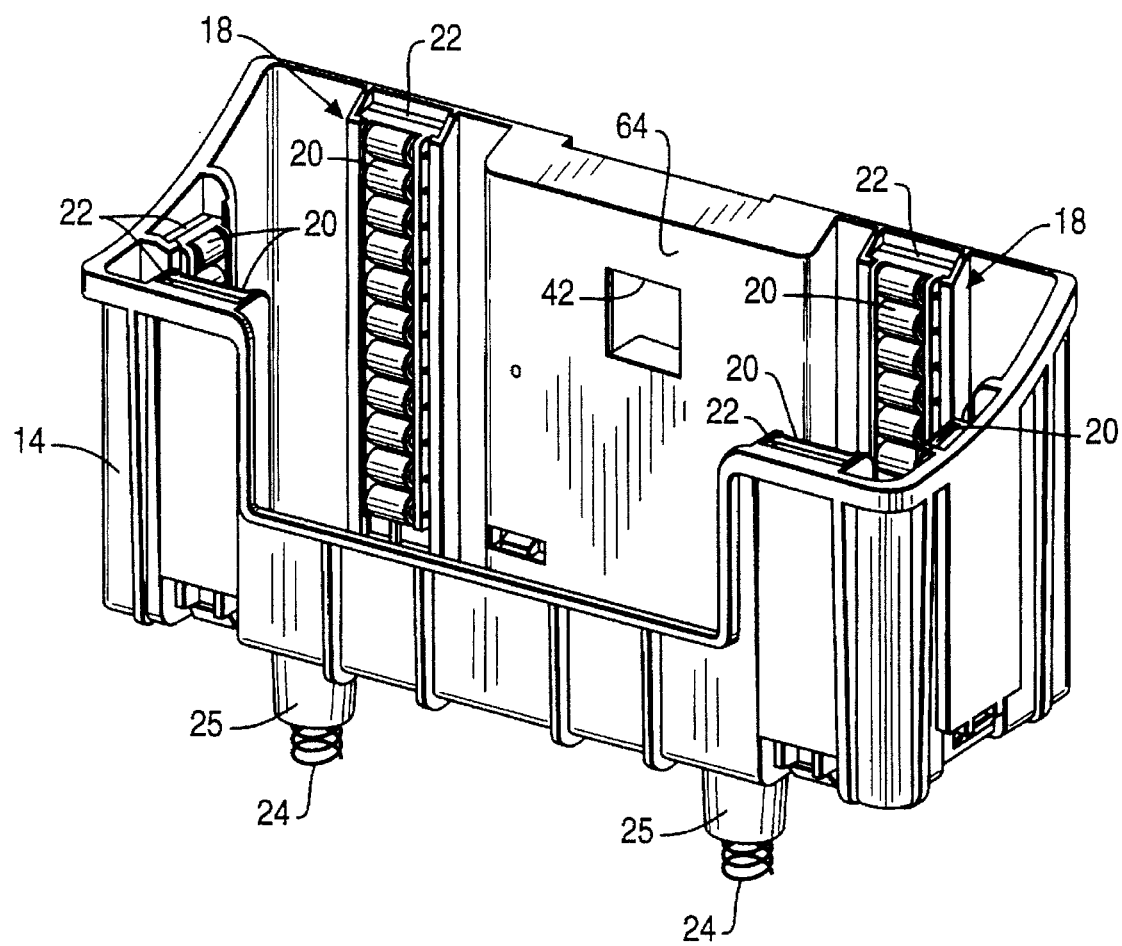
FIG. 3 is a perspective view of the receptacle of the portable computer assembly of FIG. 1.
Figure 4:
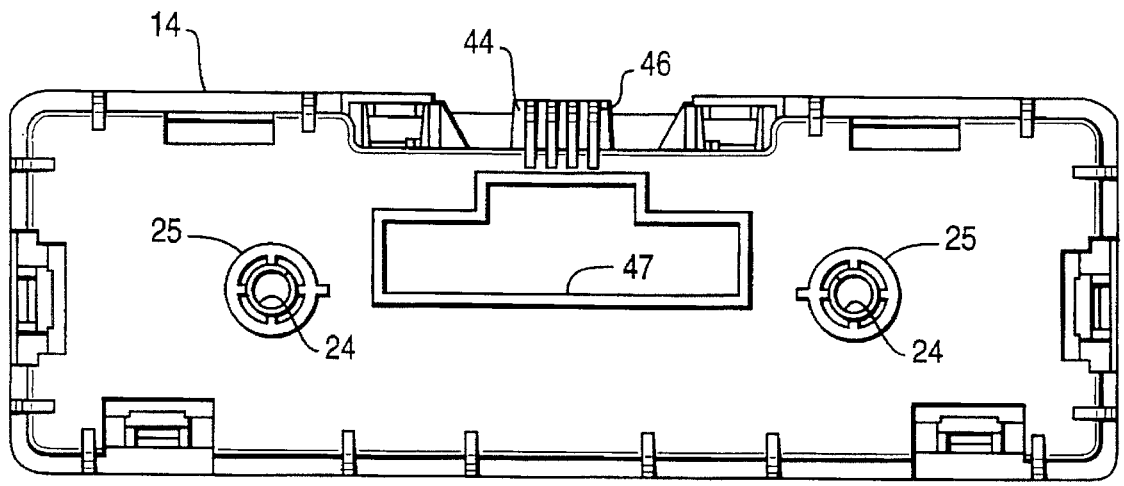
FIG. 4 is an elevational view of the bottom portion of the receptacle of the portable computer assembly of FIG. 1.

FIG. 2 shows the base 16 supporting the receptacle 14 with the portable computer 12 removed from the receptacle 14. FIG. 3 shows the receptacle 14 after the receptacle is separated from the base 16.

As shown in FIG. 3, a guide assembly 18 is secured to the receptacle 14. The guide assembly 18 functions to guide the portable computer 12 as it is being inserted into and removed from the receptacle 14. The guide assembly 18 includes six series of rollers 20 as shown in FIG. 3. Each of the series of rollers 20 includes a plurality of thermoplastic rollers which are each individually free to rotate about a respective pin.

An elastic member 22 is interposed between each of the six series of rollers 20 and the interior sidewall of the receptacle 14. Each of the elastic members 22 is secured to the receptacle 14 and a respective series of rollers 20 by a double-sided pressure activated adhesive. Alternatively, the two rear elastic members 22 may be omitted. In particular, the elastic members 22 may be interposed between the two forward and two side series of rollers 20 and the interior sidewall of the receptacle 14 while the two rear series of rollers 20 are fixedly secured to the interior sidewall of the receptacle 14 (i.e. without the use of the elastic members 22).

Each elastic member 22 is made from a foamed polyurethane material having a high resistance to temperature gradients and ultraviolet light exposure. One foamed polyurethane material which may be used is available from Minnesota Mining and Manufacturing Company of St. Paul, Minn. as product type 0180—product number SJ2502A.

Figure 7:
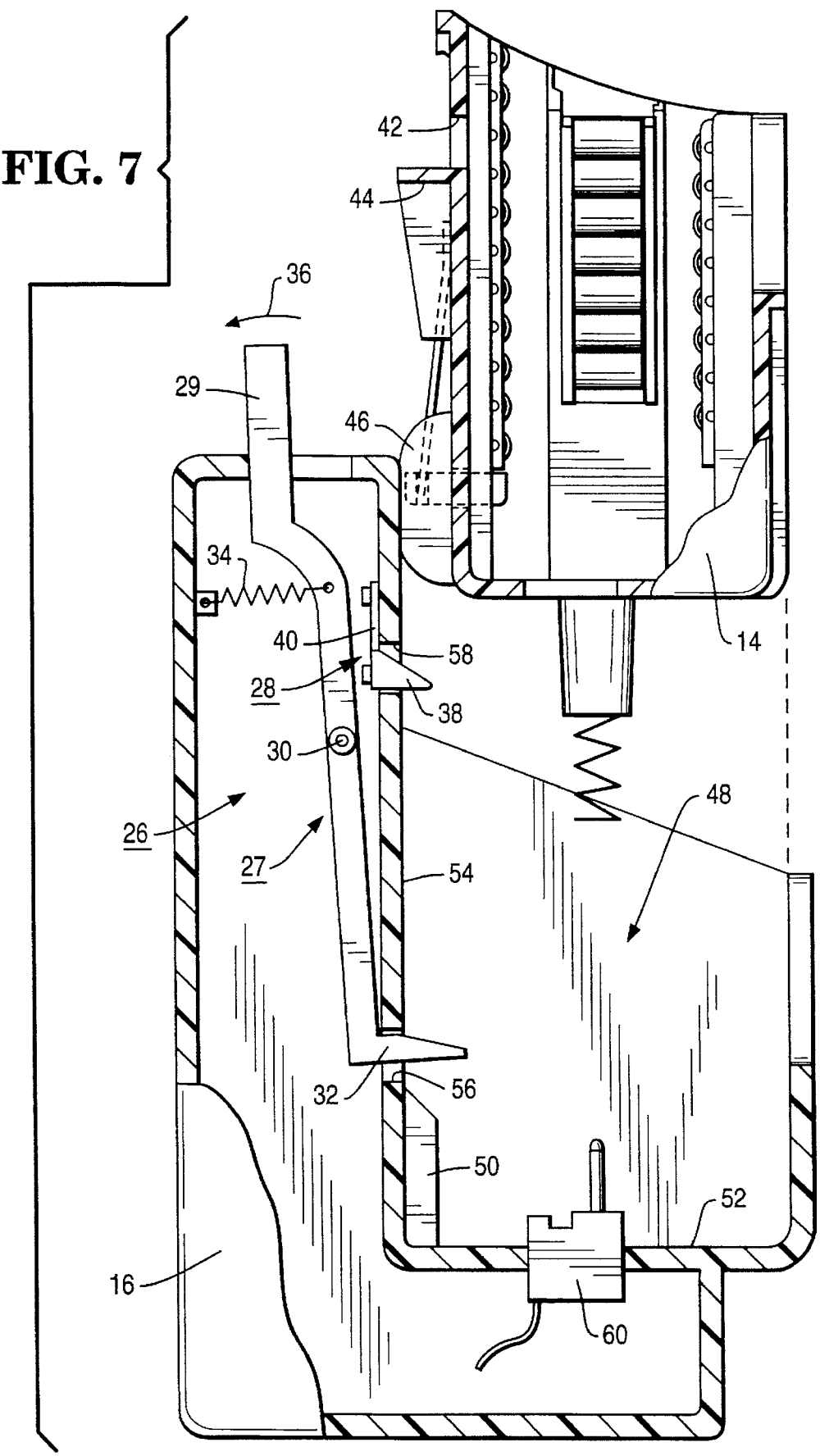
FIG. 7 is a view similar to FIG. 6 but showing the receptacle in its unlatched or released position.

The base 16 defines a recessed area 48 in which the receptacle 14 is received as shown in FIG. 7. The base 16 includes a cam surface 50 which is secured to a bottom portion 52 of the base. The cam surface 50 is also secured to a vertical wall 54 of the base 16. Defined within the vertical wall 54 is a first opening 56 and a second opening 58. An infra red (IR) transceiver 60 is secured to the bottom portion 52 of the base 16. The IR transceiver 60 includes a series of LED's (not shown).

Figure 5:
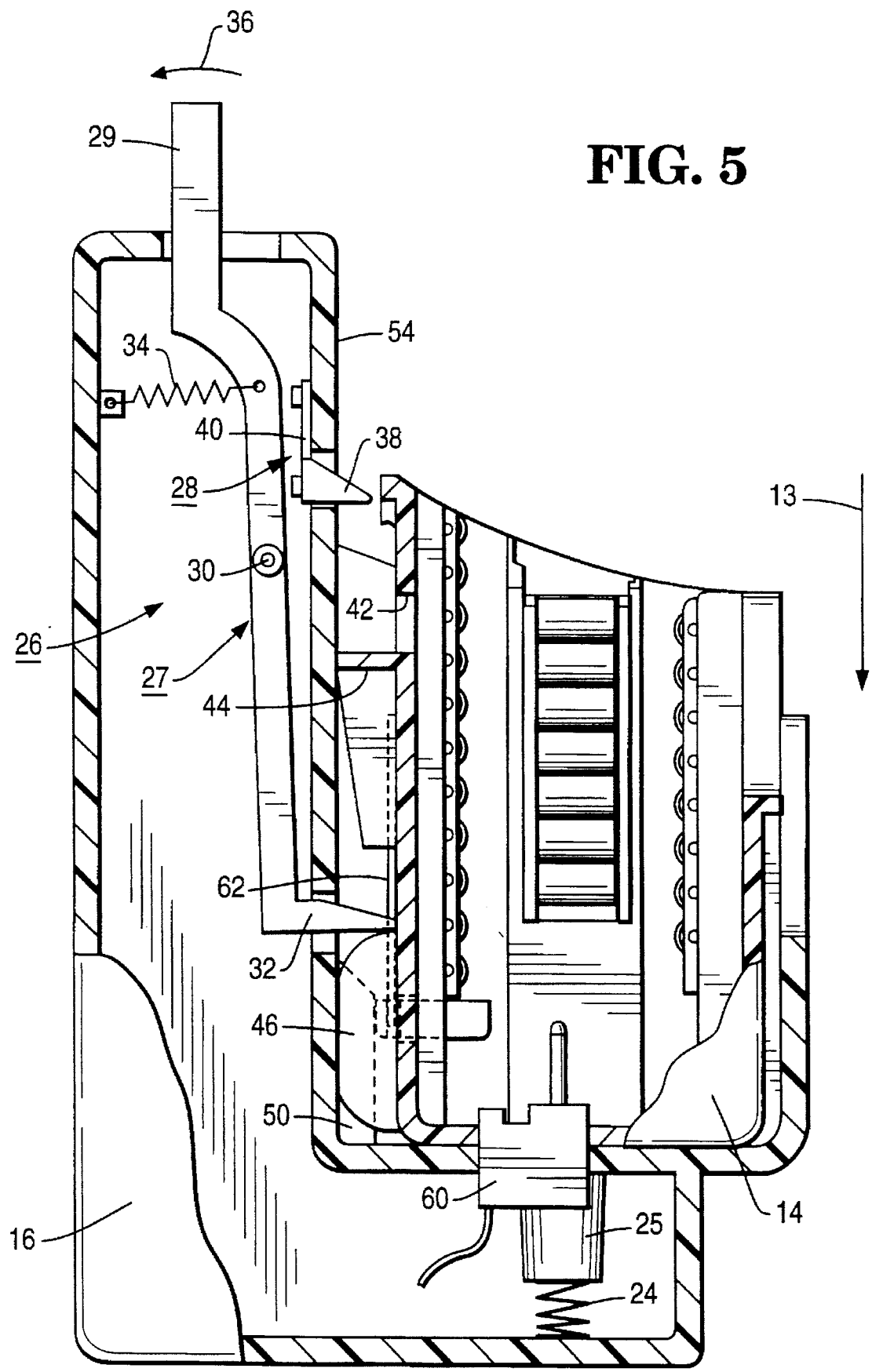
FIG. 5 is a sectional view of the portable computer assembly of FIG. 1, with the portable computer shown removed for clarity of description and with the receptacle shown in its first latched position.
Figure 6:
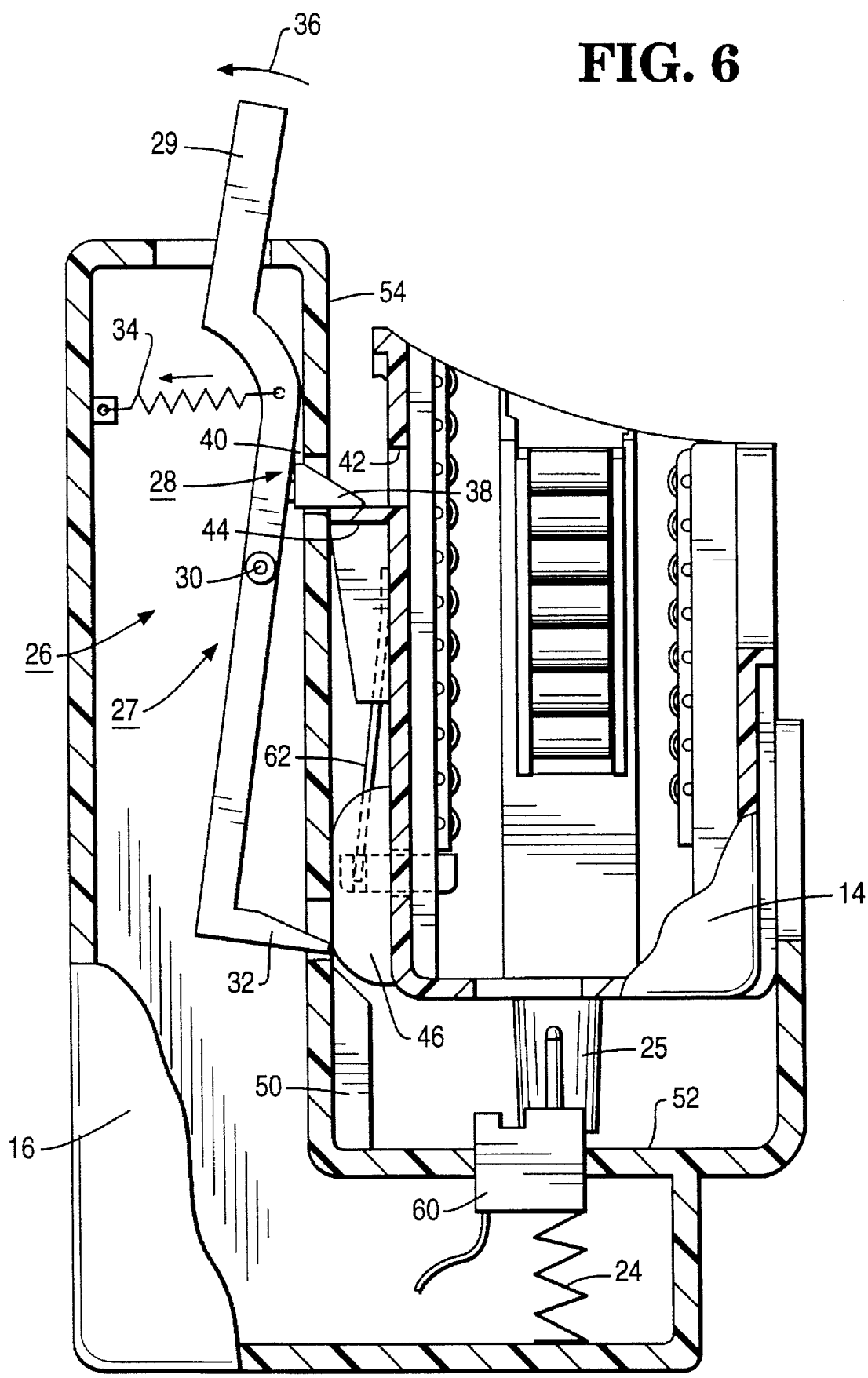
FIG. 6 is a view similar to FIG. 5 but showing the receptacle in its second latched position.

The receptacle 14 includes a pair of posts 25 secured to a bottom portion of the receptacle as shown in FIGS. 3–6 and 8. A pair of compression springs 24 is secured to the bottom portion of the receptacle 14 via the pair of posts 25. A first aperture 42 is defined in a vertical sidewall 64 of the receptacle. The receptacle includes a ledge surface 44 extending outwardly from the vertical sidewall 64 of the receptacle 14 as shown in FIGS. 5–7. The receptacle 14 also has a lock surface 46 extending outwardly from the vertical sidewall 64 of the receptacle. A second aperture 47 is defined in the bottom portion of the receptacle 14 (see FIG. 4).

Figure 8:
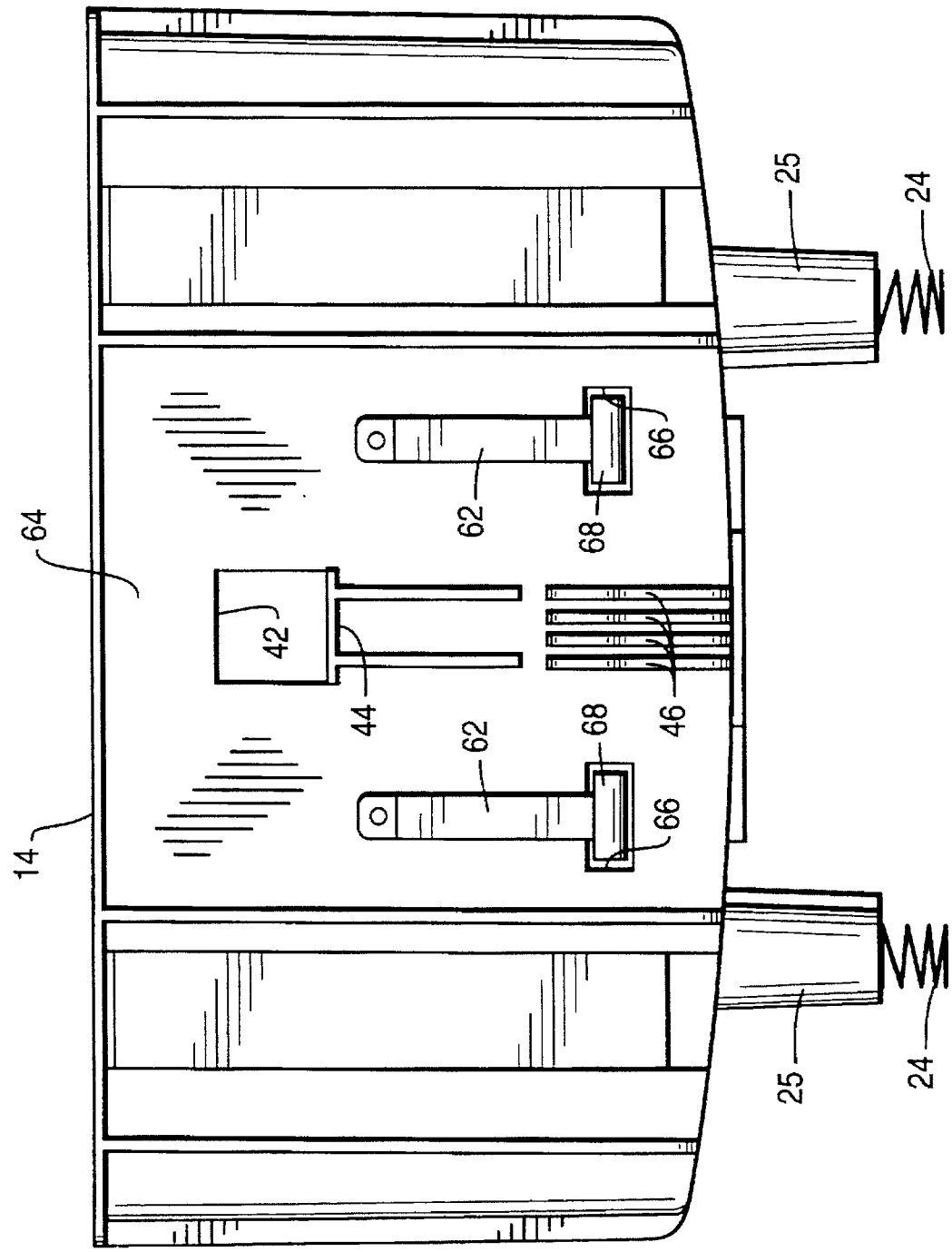
FIG. 8 is a rear elevational view of the receptacle of the portable computer assembly of FIG. 1.
Figure 9:
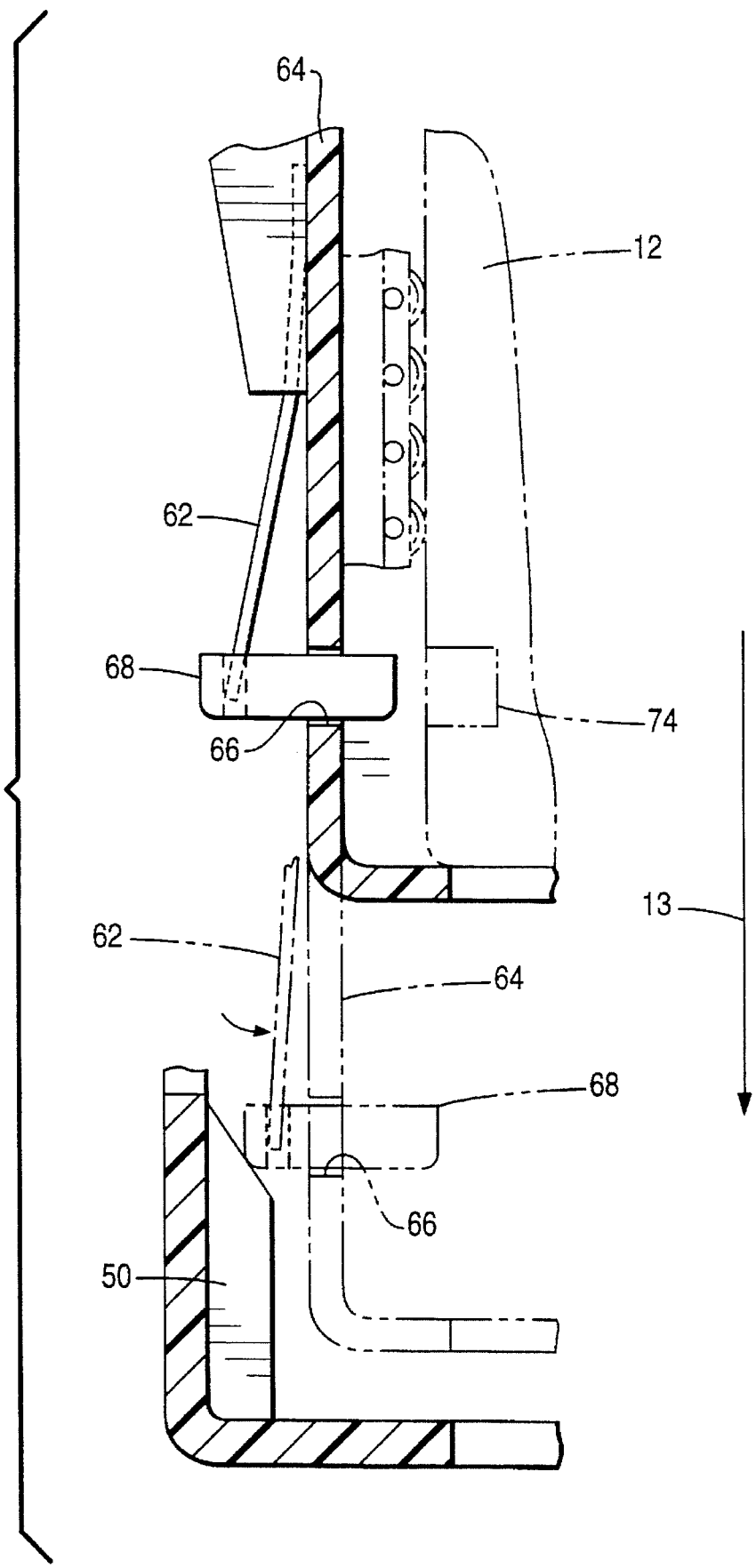
FIG. 9 is schematic view of a locking mechanism of the portable computer assembly of FIG. 1, with the locking mechanism locking the portable computer to the receptacle when the receptacle is in the first latched position.

Referring now to FIGS. 8 and 9, the receptacle further includes a pair of springs 62 secured to the vertical sidewall 64. Further defined within the vertical sidewall is a pair of locking apertures 66. The lock members 68 are slidably positioned within the respective locking apertures 66. The pair of springs 62 maintain the lock members 68 in the position shown in FIG. 9 (solid lines) absent application of external force thereto.

Figure 10:
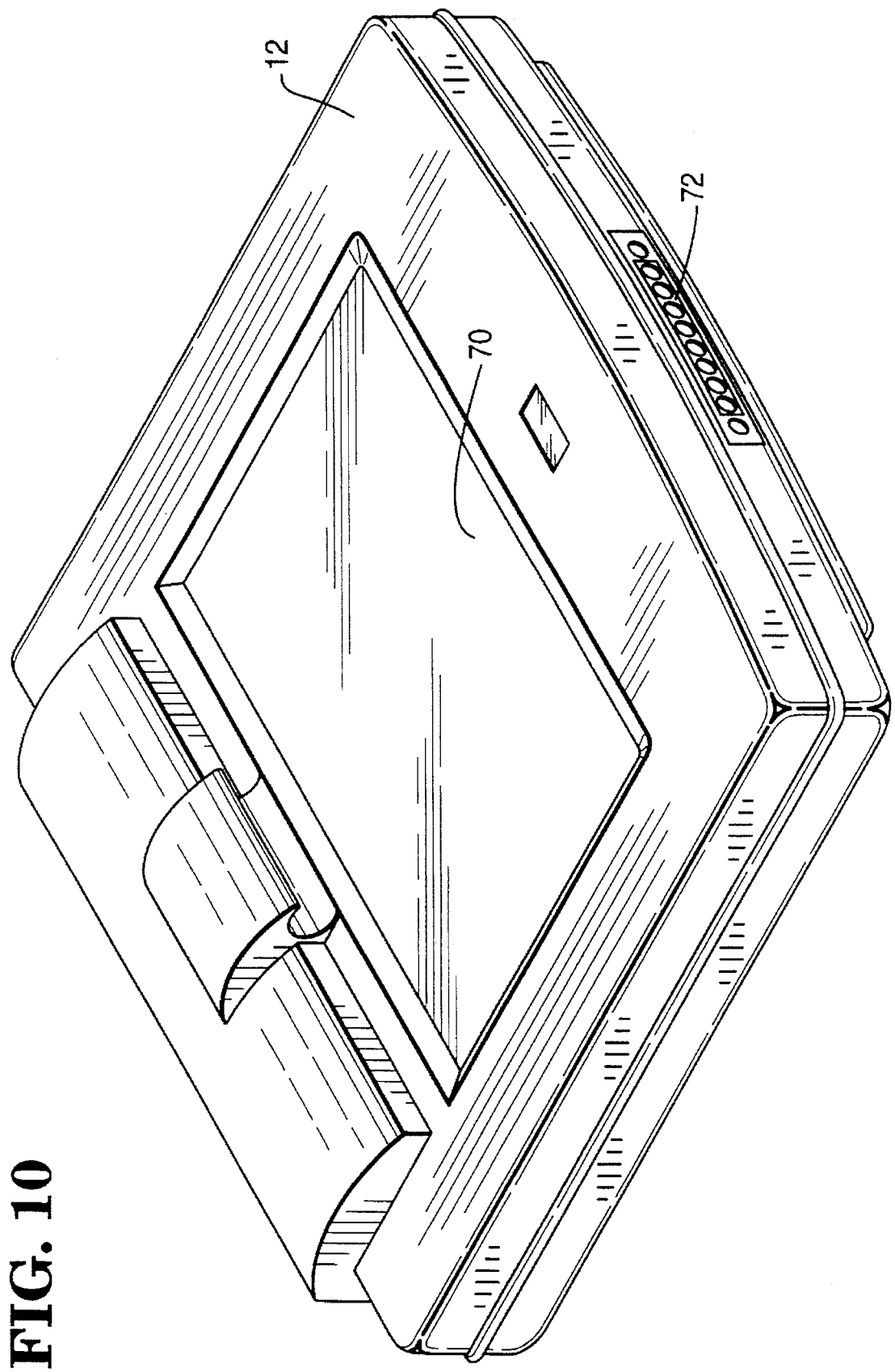
FIG. 10 is a perspective view of the portable computer of the portable computer assembly of FIG. 1.

FIG. 10 is a perspective view showing the portable computer 12. The portable computer includes a user interface 70 and an IR transceiver 72. The IR transceiver 72 includes a series of LED's.

Figure 11:
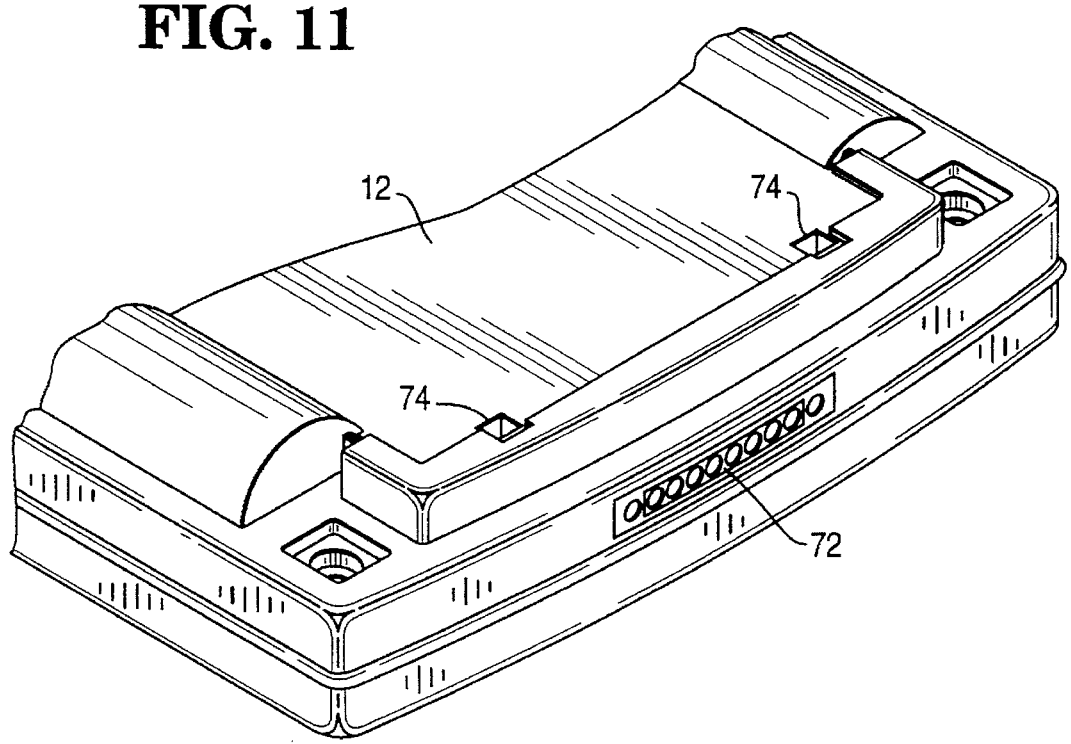
FIG. 11 is a fragmentary perspective view of a rear side of the portable computer of FIG. 10.

FIG. 11 is a fragmentary perspective view showing a rear side of the portable computer 12. Defined within the rear side of the portable computer is a pair of lock recesses 74.

Referring to FIGS. 5, 6 and 7, there is shown a latching mechanism, generally indicated by the reference numeral 26. The latching mechanism is able to latch the receptacle 14 to the base 16, and thereafter release the receptacle 14 from the base 16.

In FIG. 5, the receptacle 14 is shown latched to the base 16 in a first latched position. In FIG. 6, the receptacle 14 is shown latched to the base 16 in a second latched position. In FIG. 7, the receptacle 14 is shown released from the base 16.

The latching mechanism 26 includes a first latch assembly 27 and a second latch assembly 28. The first latch assembly 27 includes a lever 29 which pivots about a pivot pin 30. The first latch assembly further includes a movement actuator 32 which is secured to a lower end of the lever 29. The first latch assembly 27 also includes a spring 34 (schematically shown) which biases an upper end of the lever 29 in the direction of arrow 36.

The second latch assembly 28 includes a release actuator 38 and a spring 40. One end of the spring 40 is attached to the vertical sidewall 54 of the base 16 while the other end of the spring is attached to the release actuator 38. The spring 40 maintains the release actuator 38 in the position shown in FIG. 5 absent application of external force thereto.

In operation, a user would insert the portable computer 12 into the receptacle 14 as shown in FIG. 1. The user would then push the portable computer 12 downwardly in the direction of arrow 13 (see FIG. 1) until the receptacle 14 is latched to the base 16 in the first latched position as shown in FIG. 5. (Note that the portable computer is not shown in FIGS. 5–7 for clarity of description).

After the user inserts the portable computer 12 into the receptacle 14, as stated above, the lock member 68 is located by the spring 62 in a retracted position as shown in FIG. 9 (solid lines). As the portable computer is pushed downwardly in the direction of arrow 13, towards the first latched position of the receptacle 14, the lock member 68 is moved from the retracted position to a locking position (see FIG. 9—phantom lines). The lock member 68 is moved to the locking position as a result of the lock member being forced into the cam surface 50 which in turn advances a portion of the lock member through the locking aperture 66 as shown in FIG. 9 (phantom lines). In the locking position, the lock member 68 is located in the lock recess 74 of the portable computer 12. This occurs when (1) the portable computer 12 is held by the receptacle 14, and (2) the receptacle 14 is in the first latched position. The other lock member 68 is moved from a retracted position to a locking position in a similar manner.

When the portable computer 12 is locked to the receptacle 14, the IR transceiver 60 of the base 16 and the IR transceiver 72 of the portable computer 12 interface with each other through the aperture 47 defined in the bottom portion of the receptacle 14 so as to transfer electrical signals to and from the portable computer.

In the first latched position (see FIG. 5), the lock surface 46 of the receptacle 14 is being forced upwardly against the movement actuator 32 of the first latch assembly due to the spring bias of spring 24. The lock surface 46 (and thus the receptacle 14) is prevented from moving further upwardly than its position shown in FIG. 5 since the movement actuator 32 blocks its advance.

The receptacle 14 moves from the first latched position (as shown in FIG. 5) to the second latched position (as shown in FIG. 6) due to actuation or displacement of the movement actuator 32 out of the path of travel of the lock surface 46. Displacement of the movement actuator 32 is achieved by the user pulling the top portion of the lever 29 in a direction opposite to the direction of the arrow 36.

In the second latched position (see FIG. 6), the ledge surface 44 of the receptacle 14 is being forced upwardly against the release actuator 38 of the second latch assembly due to the spring bias of spring 24. The ledge surface 44 (and thus the receptacle 14) is prevented from moving further upwardly than its position shown in FIG. 6 since the release actuator 38 blocks its advance.

The receptacle 14 moves from the second latched position (as shown in FIG. 6) to an unlatch or released position (as shown in FIG. 7) due to actuation or displacement of the release actuator 38 out of the path of travel of the ledge surface 44.

Displacement of the release actuator 38 is achieved by the user pushing the release actuator against the spring bias of spring 40. For example, a user may insert a finger through the first aperture 42 of the receptacle 14 and push the release actuator out of the path of travel of the ledge surface 44 so as to allow the ledge surface and the receptacle to move in an upwardly direction.

Figure 12:
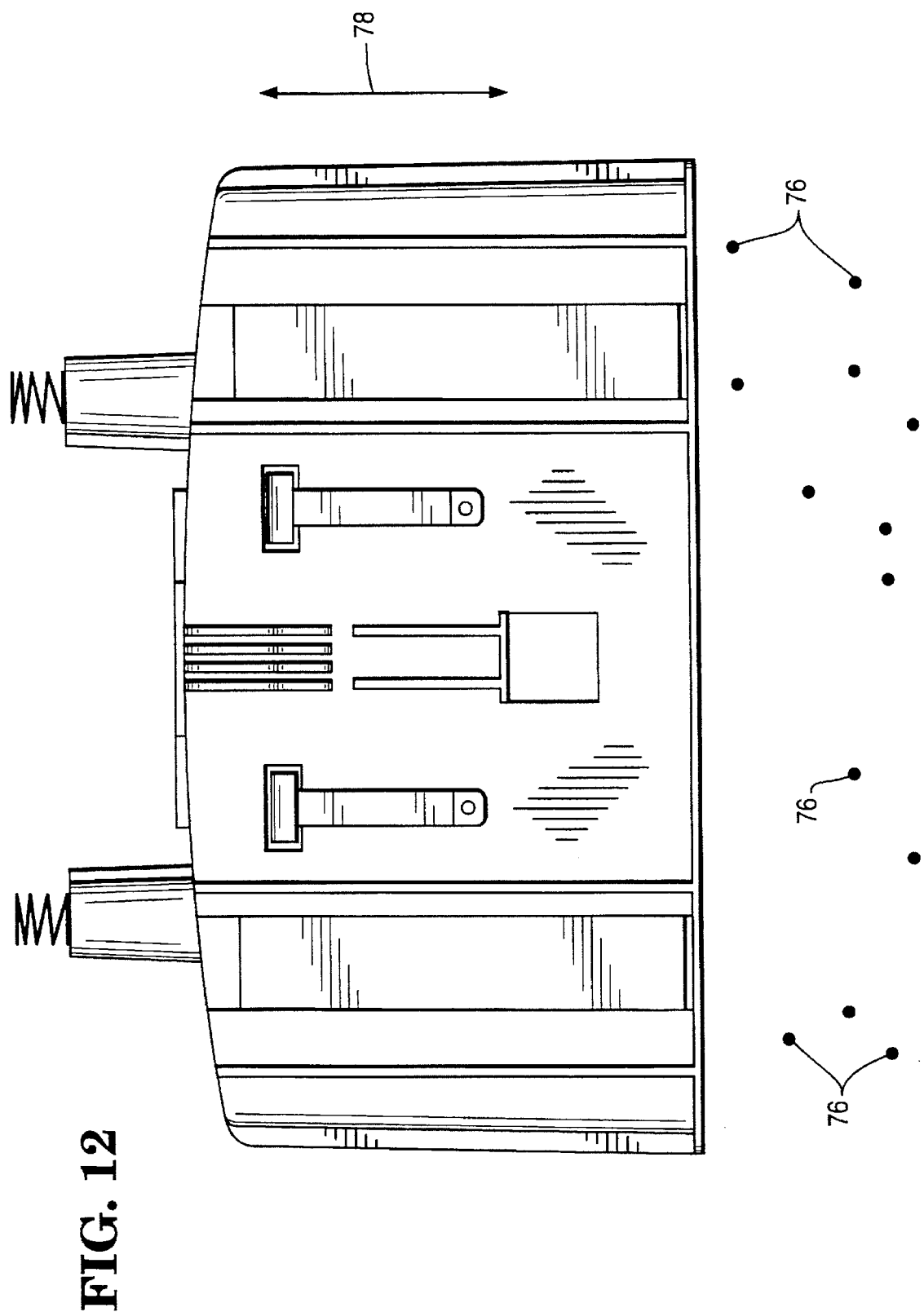
FIG. 12 is a rear elevational view of the receptacle of the portable computer assembly of FIG. 1, with the receptacle shown in an upside down orientation.

Thereafter, the receptacle 14 is able to be moved out of the recess area 48 of the base 16 so that the receptacle 14 is separated from the base as shown in FIG. 7. Once this is achieved, the user can move the receptacle from an orientation as show in FIG. 7 (or FIG. 8) to an upside down orientation as shown in FIG. 12. This will cause particulate 76, located in the receptacle, to fall out of the receptacle 14 due to gravity. In order to further enhance the removal of the particulate 76 from the receptacle 14, the receptacle is shaken in the direction of the double-headed arrow 78. Thereafter, the receptacle 14 may be reinserted and pushed downwardly into the base 16 so as to be latched in the first latched position as hereinbefore described.

While the invention has been illustrated and described in detail in the drawings and foregoing description, such illustration and description is to be considered as exemplary and not restrictive in character, it being understood that only the preferred embodiment have been shown and described and that all changes and modifications that come within the spirit of the invention are desired to be protected.

What is claimed is:

1. A portable computer assembly, comprising:

a portable computer;

a receptacle adapted to hold said portable computer;

a base for supporting said receptacle; and a latch for latching said receptacle to said base, wherein said latch comprises a movement actuator, and wherein actuation of the movement actuator allows movement of said receptacle from a first latched position to a second latched position.

2. The portable computer assembly of claim 1, wherein said latch further comprises a release actuator, and wherein actuation of the release actuator allows release of said receptacle from said base.

3. The portable computer assembly of claim 2, further comprising a guide assembly, secured to said receptacle, for guiding said portable computer within said receptacle.

4. The portable computer assembly of claim 3, wherein said guide assembly comprises a series of rollers secured to said receptacle.

5. A portable computer assembly, comprising:

a portable computer;

a receptacle adapted to hold said portable computer;

a base for supporting said receptacle;

a latch for latching said receptacle to said base;

a guide assembly, secured to said receptacle, for guiding said portable computer within said receptacle; and an elastic member interposed between said guide assembly and said receptacle.

6. The portable computer assembly of claim 1, wherein:

said portable computer is locked to said receptacle when (1) said portable computer is held by said receptacle, and (2) said receptacle is in the first latched position, and said portable computer is unlocked from said receptacle when (1) said portable computer is held by said receptacle, and (2) said receptacle is in the second latched position.

7. The portable computer assembly of claim 1, further comprising a spring secured to a bottom portion of said receptacle, wherein:

said spring is compressed between a bottom portion of said base and the bottom portion of said receptacle when said receptacle is in the first latched position, and said spring displaces the bottom portion of said receptacle away from the bottom portion of said base so as to move said receptacle from the first latched position to the second latched position.

8. A portable computer assembly, comprising:

a portable computer;

a receptacle adapted to hold said portable computer;

a base for supporting said receptacle; and a latch for latching said receptacle to said base, wherein:

said portable computer has a first IR transceiver secured thereto;

said base has a second IR transceiver secured thereto; and said receptacle has an aperture defined therein through which the first and second IR transceivers interface with each other so as to transfer signals to or from the portable computer when (1) said receptacle is supported by said base, and (2) said portable computer is held by said receptacle.

9. A method of removing particulate from a portable computer storage system which has a receptacle, a base and a latch, including the steps of:

stowing a portable computer within the receptacle;

latching the receptacle to the base so as to prevent release of the receptacle from the base;

unlatching the receptacle from the base so as to allow release of the receptacle from the base;

removing the portable computer from the receptacle;

separating the receptacle from the base after the unlatching step; and removing particulate from the receptacle after the separating step.

10. The method of claim 9, wherein the step of removing particulate from the receptacle includes the step of positioning the receptacle in an upside down orientation.

11. The method of claim 10, wherein the step of removing particulate from the receptacle further includes the step of shaking the receptacle.

12. The method of claim 9, wherein the unlatching step includes the steps of:

actuating a movement actuator so as to allow movement of the receptacle from a first latched position to a second latched position; and actuating a release actuator so as to allow release of the receptacle from the base.

13. The method of 12, wherein the unlatching step further includes the step of displacing a bottom portion of the receptacle away from a bottom portion of the base when the receptacle is moved from the first latched position to the second latched position.

14. A portable computer storage system, comprising:

a receptacle adapted to hold a portable computer;

a base for supporting said receptacle; and a lock and release mechanism for locking said receptacle to said base, wherein said lock and release mechanism comprises a movement actuator, and wherein actuation of the movement actuator allows movement of said receptacle relative to said base.

15. The system of claim 14, wherein actuation of the movement actuator allows movement of said receptacle from a first locked position to a second locked position.

16. The system of claim 15, wherein said lock and release mechanism further comprises a release actuator, and wherein actuation of the release actuator allows release of said receptacle from said base.

17. The system of claim 14, wherein:

the portable computer has a first IR transceiver secured thereto;

said base has second IR transceiver secured thereto; and said receptacle has an aperture defined therein through which the first and second IR transceivers interface with each other so as to transfer signals to or from the portable computer when (1) said receptacle is supported by said base, and (2) the portable computer is held by said receptacle.

18. The system of claim 14, further comprising a guide assembly, secured to said receptacle, for guiding the portable computer within said receptacle.

19. A portable computer storage system, comprising:

a receptacle adapted to hold a portable computer;

a base for supporting said receptacle;

a lock and release mechanism for locking said receptacle to said base;

a guide assembly, secured to said receptacle, for guiding the portable computer within said receptacle; and an elastic member interposed between said guide assembly and said receptacle.

20. A portable computer storage system, comprising:

a receptacle adapted to hold a portable computer;

a base for supporting said receptacle;

a lock and release mechanism for locking said receptacle to said base; and wherein said lock and release mechanism comprises a movement actuator, and wherein actuation of the movement actuator allows movement of said receptacle from a first locked position to a second locked position, wherein the portable computer is locked to said receptacle when (1) the portable computer is held by said receptacle, and (2) said receptacle is in the first locked position, and wherein the portable computer is unlocked from said receptacle when (1) the portable computer is held by said receptacle, and (2) said receptacle is in the second locked position.

21. A portable computer storage system, comprising:

a receptacle adapted to hold a portable computer;

a base for supporting said receptacle;

a lock and release mechanism for locking said receptacle to said base; and a spring secured to a bottom potion of said receptacle, wherein said lock and release mechanism comprises a movement actuator, and wherein actuation of the movement actuator allows movement of said receptacle from a first locked position to a second locked position, wherein said spring is compressed between a bottom portion of said base and the bottom portion of said receptacle when said receptacle is in the first locked position, and wherein said spring displaces the bottom portion of said receptacle away from the bottom portion of said base so as to move said receptacle from the first locked position to the second locked position.

* * * * *